US012701495B2

(12) United States Patent
Tayyab et al.

(10) Patent No.: US 12,701,495 B2
(45) Date of Patent: Aug. 4, 2026

(54) DYNAMIC NETWORK-CONTROLLED UPLINK ACCESS

(71) Applicant: Nokia Technologies OY, Espoo (FI)

(72) Inventors: Muhammad Tayyab, Oulu (FI); Nitin Mangalvedhe, Hoffman Estates, IL (US)

(73) Assignee: Nokia Technologies OY, Espoo (FI)

( * ) Notice: Subject to any disclaimer, the term of this patent is extended or adjusted under 35 U.S.C. 154(b) by 286 days.

(21) Appl. No.: 18/506,512

(22) Filed: Nov. 10, 2023

(65) Prior Publication Data

US 2025/0159584 A1 May 15, 2025

(51) Int. Cl.
*H04W 48/02* (2009.01)
*H04W 52/02* (2009.01)
*H04W 76/20* (2018.01)

(52) U.S. Cl.
CPC ....... *H04W 48/02* (2013.01); *H04W 52/0235* (2013.01); *H04W 76/20* (2018.02)

(58) Field of Classification Search
CPC .. H04W 48/02; H04W 52/0235; H04W 76/20
See application file for complete search history.

(56) References Cited

U.S. PATENT DOCUMENTS

| | | | | |
|---|---|---|---|---|
| 12,127,099 B2 * | 10/2024 | Palle Venkata | ......... | H04W 8/24 |
| 12,160,747 B1 * | 12/2024 | Mariyani | .............. | H04W 24/08 |
| 2013/0242955 A1 * | 9/2013 | Fan | ........................ | H04W 48/02 |
| | | | | 370/336 |
| 2014/0004857 A1 * | 1/2014 | Rune | ..................... | H04W 48/12 |
| | | | | 455/434 |

FOREIGN PATENT DOCUMENTS

| | | | | | |
|---|---|---|---|---|---|
| WO | WO-2019117791 A1 * | 6/2019 | ............ | H04W 76/27 |
| WO | WO-2022016474 A1 * | 1/2022 | ............ | H04W 48/08 |

OTHER PUBLICATIONS

Adaptive Multiple Access Class Barring Factors for M2M Communications in LTE-A Networks; Sami Gharbi, Nawel Zangar; Mediatron Laboratory Higher School of Communications, Sup'Com Tunis 2 Faculty of Science of Tunis, University of Tunis El-Manar (Year: 2015).*

* cited by examiner

*Primary Examiner* — Deepa Belur
(74) *Attorney, Agent, or Firm* — Harness, Dickey & Pierce, P.L.C.

(57) ABSTRACT
A radio access network element including a processor and a memory storing computer-executable instructions coupled to the processor. The processor is configured to execute the computer-executable instructions to cause the radio access network element to generate a signal including information indicating uplink access restrictions to be imposed on one or more user equipment devices in response to determining that at least one uplink-transmission-restriction criterion is satisfied, and transmit the signal to the one or more user equipment devices.

20 Claims, 6 Drawing Sheets

DYNAMIC NETWORK-CONTROLLED UPLINK ACCESS

TECHNICAL FIELD

This application relates generally to wireless networks, and more specifically to dynamic uplink access control.

BACKGROUND

Fifth generation (5G) wireless communications networks are the next generation of mobile communications networks. Standards for 5G networks are currently being developed by the 3rd Generation Partnership Project (3GPP). These standards are known as 3GPP New Radio (NR) standards. Various current wireless network implementations employ Unified Access Control (UAC) signaling to control user equipment devices (UE) access to the wireless transmission medium. UAC signaling includes the use of Wakeup signals (WuS) and Wakeup Radios (WUR) to reduce UE energy consumption.

SUMMARY

The scope of protection sought for various example embodiments is set out by the independent claims. The example embodiments and/or features, if any, described in this specification that do not fall under the scope of the independent claims are to be interpreted as examples useful for understanding various embodiments.

In example embodiments, a radio access network element includes a processor and a memory storing computer-executable instructions coupled to the processor. The processor is configured to execute the computer-executable instructions to cause the radio access network element to generate a signal including information indicating uplink access restrictions to be imposed on one or more user equipment devices in response to determining that at least one uplink-transmission-restriction criterion is satisfied, and to transmit the signal to the one or more user equipment devices. In various example embodiments the signal includes information indicating that uplink transmissions of one or more particular types of signals are restricted. In alternative example embodiments, the signal includes information indicating whether the uplink access restrictions are applicable for a particular period of time.

In some example embodiments, the processor is further configured to execute the computer-executable instructions to cause the radio access network element to transmit at least one dynamic uplink access restriction (DUAR) criteria to the one or more user equipment devices.

In yet other example embodiments, the processor is further configured to execute the computer-executable instructions to cause the radio access network element to determine that the at least one uplink-transmission-restriction criterion is no longer applicable. In response to determining that the at least one uplink-transmission-restriction criterion is no longer applicable, the processor is further configured to execute the computer-executable instructions to cause the radio access network element to generate a second signal including information indicating that the uplink access restrictions are no longer to be imposed, and transmit the second signal to the one or more user equipment devices.

In various example embodiments, the processor is further configured to execute the computer-executable instructions to cause the radio access network element to receive uplink transmissions from the one or more user equipment devices, and determine that the uplink transmissions from the one or more user equipment devices satisfy at least one uplink-transmission-restriction criterion.

In some example embodiments, the signal includes a wakeup signal (WuS) including one or more bits defining the uplink access restrictions.

In other example embodiments, the processor is configured to execute the computer-executable instructions to cause the radio access network element to transmit a signal including information indicating that a WuS is configured to include information associated with uplink access restrictions, wherein the to the one or more user equipment devices using a broadcast system information signal or dedicated radio resource control (RRC) signal.

In other example embodiments, the processor is configured to execute the computer-executable instructions to cause the radio access network element to preconfigure a plurality of user equipment devices into a group to which particular uplink access restrictions apply, wherein the group is assigned a group identifier; and wherein the signal includes the group identifier.

In one or more example embodiments, the signal transmitted to the one or more user equipment devices restricts transmission of uplink messages during an uplink access restriction period.

In various example embodiments, a user equipment device includes a processor and a memory storing computer-executable instructions coupled to the processor, wherein the processor is configured to execute the computer-executable instructions to cause the user equipment device to receive from the radio access network element a signal including information indicating uplink access restrictions to be imposed on the user equipment device, and transmit uplink messages to the radio access network element in accordance with the signal.

In some example embodiments, the signal includes information indicating that uplink transmissions of one or more particular types of signals are restricted. In other example embodiments the signal includes information indicating whether the uplink access restrictions are applicable for a particular period of time.

In one or more example embodiments, the processor is further configured to execute the computer-executable instructions to cause the user equipment device to receive at least one dynamic uplink access restriction (DUAR) criteria from the radio access network element. In other example embodiments, the processor is further configured to execute the computer-executable instructions to cause the user equipment device to receive a second signal including information indicating that the uplink access restrictions are no longer to be imposed.

In further example embodiments, the processor is further configured to execute the computer-executable instructions to cause the user equipment device to receive via a broadcast system information signal or dedicated radio resource control (RRC) signal information indicating that a WuS is configured to include information associated with uplink access restrictions.

In some example embodiments, the signal includes a group identifier identifying a group of user equipment devices to which particular uplink access restrictions apply, and the processor is further configured to execute the computer-executable instructions to cause the user equipment device to determine, based on the group identifier, whether the uplink access restrictions apply to the user equipment device.

In various example embodiments, a method includes determining, by a radio access network element, that at least one uplink-transmission-restriction criterion is satisfied, generating, at the radio access network element, a signal including information indicating uplink access restrictions to be imposed on one or more user equipment devices, and transmitting the signal from the radio access network element to the one or more user equipment devices.

In some example embodiments the signal includes information indicating that uplink transmissions of one or more particular types of signals are restricted.

In other example embodiments, method further includes transmitting a deactivation signal from the radio access network element to the one or more user equipment device, wherein the deactivation signal indicates that the uplink access restrictions are to be terminated.

BRIEF DESCRIPTION OF THE DRAWINGS

Example embodiments will become more fully understood from the detailed description given herein below and the accompanying drawings, wherein like elements are represented by like reference numerals. The example embodiments are given by way of illustration only, and thus are not limiting of this disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures. One or more example embodiments described herein may be combined.

Figure 1:
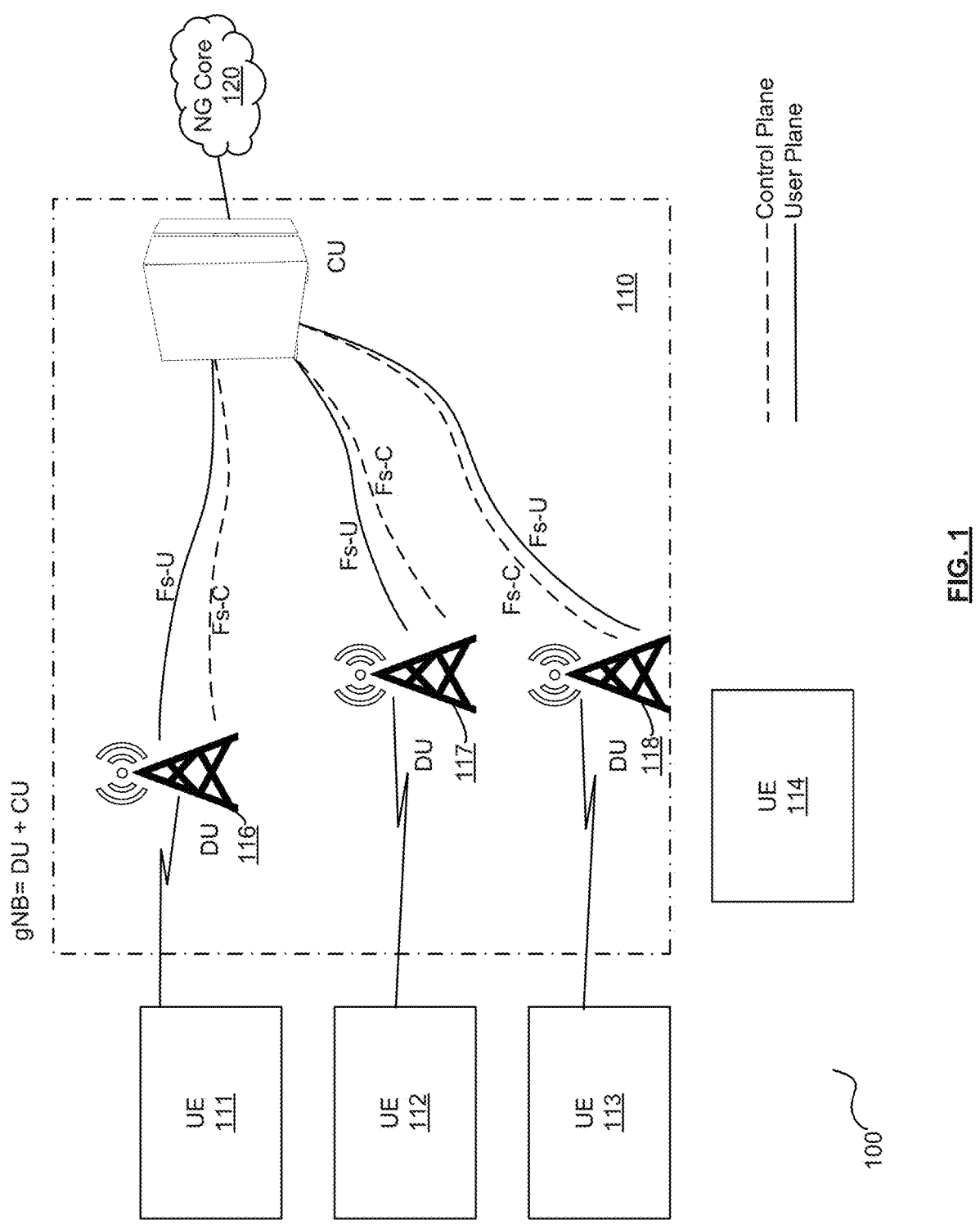
FIG. 1 is a block diagram illustrating a network employing dynamic network-controlled uplink access, in accordance with various embodiments of the present disclosure.

Referring first to FIG. 1, various embodiments of a network employing dynamic network-controlled uplink access will be discussed. Network 100 includes Next Generation Node B (gNB) 110 communicatively coupled to Next Generation (NG) Core network 120, and user equipment devices (UEs) 111, 112, 113, and 114 wirelessly coupled to gNB 100. gNB 100 includes a central unit (CU) 115 and distributed units (DUs) 116, 117, and 118. CU 115 is a logical node that includes gNB functions such as transfer of user data, mobility control, radio access network sharing, positioning, session management, and other functions not allocated exclusively to the DUs 116, 117, and 118. CU 115 controls the operation of DUs 116, 117, and 118 over front-haul interfaces Fs-C (control plane) and Fs-U (user plane).

DUs 116, 117, and 118 are logical nodes including a subset of the gNB functions, depending on the functional split option. Multiple potential split options are currently under consideration by 3GPP. Operation of DUs 116, 117, and 118 is controlled by CU 115. As illustrated, DUs 116, 117, and 118 include wireless transceivers used to communicate with UEs 111, 112, 113, and 114.

The term "gNB", as used herein, is used interchangeably with the term "radio access network element." A gNB is an example of a radio access network element (RAN) used in 5G and other wireless standards. In general, a RAN refers to a component of a wireless communications system that connects individual devices such as access points, sensors, cellphones, sensors, robots, and other devices with wireless capabilities, to other parts of a network through a radio link. Examples of other radio access network elements include, but are not limited to, base stations, access points, routers, gateways, or the like. RAN elements complying with wireless standards and technologies other than 5G can be used without departing from the spirit and scope of the present disclosure.

Figure 2:
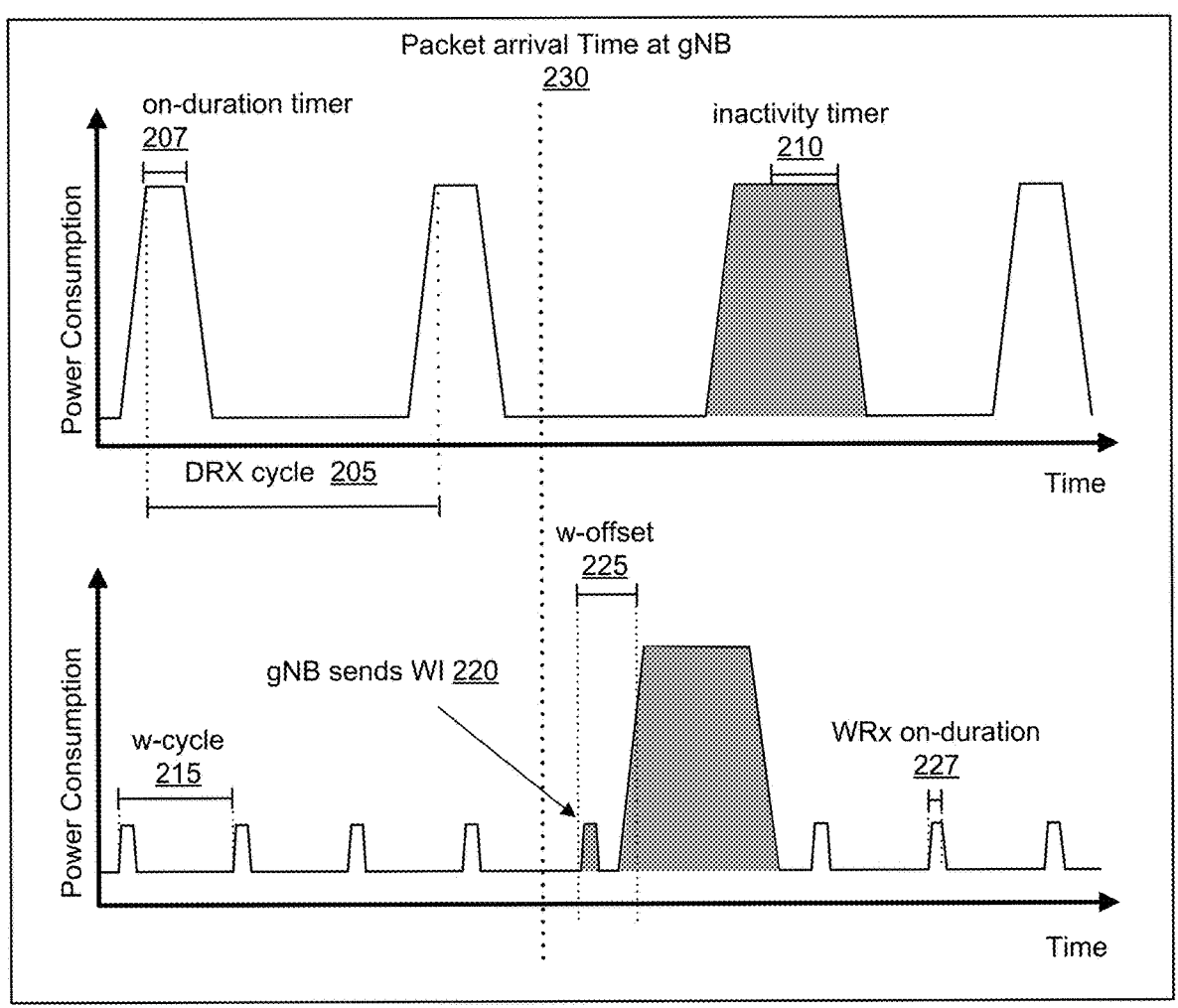
FIG. 2 is a diagram illustrating examples of representative power consumption profiles of UE employing discontinuous reception (DRX) and UE using Wakeup Signal (WuS) in accordance with various embodiments of the present disclosure.

Referring next to FIG. 2, the representative power consumption profiles of UE employing discontinuous reception (DRX) and UE using Wakeup Signals (WuS) will be discussed.

Discontinuous reception (DRX) is a method employed in various wireless technologies to allow the UE to turn its receiver off during periods of inactivity. When using DRX, UEs periodically wake up once per DRX cycle 205 for a period determined by the on-duration timer 207, which dominates the power consumption of the UE.

If UEs are configured to wake up only when they are triggered, e.g., paging, power consumption could be dramatically reduced. This can be achieved by using a WuS to trigger the main radio, and a separate receiver that can monitor for WuS with ultra-low power consumption. The power consumption for monitoring wake-up signals depends on the WuS design and the hardware module of the wake-up receiver (WRx) used for signal detecting and processing.

The main WuS operating principle is that in every wake-up cycle (w-cycle) 215, the WRx monitors a set of specified subcarriers for a short duration of time to determine whether it receives a wake-up indicator (WI) 220. Through the WI 220, the network informs the UE to decode the physical downlink control channel (PDCCH) with a specified time offset, called w-offset 225. Once the WRx successfully detects the WI 220, the baseband processor (BBP) will be switched on. After that, the BBP decodes the PDCCH message arriving at time 230, it remains an active state for a preconfigured on-duration referred to as the WRx on-duration 227, followed by the initiation of its inactivity timer.

After the inactivity timer 210 is initiated, and if a new PDCCH message is received before the timer expiration, the BBP re-initiates its inactivity timer 210. However, if there is no PDCCH message received before the expiration of the inactivity timer, a sleep period starts, the UE switches to its sleep state, and WRx operates according to its w-cycle.

As shown in FIG. 2, the WuS reduces the UE energy consumption compared to baseline DRX as the energy consumption related to decoding unscheduled PDCCHs is avoided. Moreover, since the w-cycle can be short, essentially without increasing the energy consumption, the buffering delay can be reduced compared to DRX.

In various embodiments, the efficiencies of the WuS approach can be leveraged to provide dynamic network-controlled uplink access. In some embodiments, the WuS is modified to include additional bits to provide the UE receiving the WuS with information about uplink access restrictions, as discussed in greater detail below. In other embodiments, rather than using a WuS to provide uplink access restriction information, one or more separate dedicated signals are used to provide that information. Any signal used to carry information indicating dynamic uplink access restrictions to be imposed on one or more UE is referred to herein as a dynamic uplink access restriction (DUAR) signal, or message.

Various embodiments described herein achieve dynamic uplink access control by transmitting one or more DUAR signals to user equipment devices (UE). In some embodiments, these DUAR signals include activation signals initiating UL access restrictions and/or indicating that the UE is to implement barring evaluations, deactivation signals terminating UL access restrictions and/or indicating that the UE is to stop performing barring evaluations, and/or other signals related to UE UL access restrictions. The UE include, but are not limited to, reduced capacity (Redcap) UEs, Internet of Things (IoT) devices, industrial sensors, controllers, wearables, or other power-sensitive, small form-factor devices including, but not limited to, devices introduced in 3GPP Rel-17 Work Item RP-210918.

Characteristics/requirements of some industrial wireless sensors may include communication service availability of 99.99%, an end-to-end latency of less than about 100 ms, a reference bit rate of less than about 2 Mbps (potentially asymmetric e.g., UL heavy traffic) for substantially all use cases, the device is expected to be mostly stationary, and the battery should last at least a few years. For safety-related sensors, the latency requirement is more stringent, for example about 5-10 ms.

Characteristics/requirements of some video surveillance equipment are described in TS 22.804. For these devices the reference economic video bit rate is expected to be about 2-4 Mbps, with latency requirement less than about 500 ms, and a reliability requirement of about 99%-99.9%. High-end video applications, e.g., for farming, require about 7.5-25 Mbps. The traffic pattern for such devices is generally dominated by uplink (UL) transmissions.

Characteristics/requirements of some wearables include a reference bit rate for smart wearable applications of about 10-50 Mbps in the downlink (DL) and minimum of about 5 Mbps in the UL, a peak bit rate of the device is higher, e.g., about 150 Mbps for downlink and about 50 Mbps for uplink. The battery of the device should last multiple days (up to 1-2 weeks).

In many cases, the above devices generate UL traffic periodically, e.g., smart electricity metering, or as a burst after the detection of events. For example, low water or mineral concentration in crop soil behavior can result in UL traffic bursts, which can put stress on a gNB receiver. In various embodiments described herein, the gNB may be able to determine that a relatively large threshold number of UEs are likely to access the system to send the same event report based on receiving one or more early event reports from some UEs. In some such instances, the gNB can temporarily prevent access to all such UEs, which may have some shared identity. This provides an advantage of reducing the likelihood and/or preventing a communications channel from being overwhelmed with too many UL messages.

Furthermore, various embodiments provide a way of controlling UE uplink transmissions that is simpler than Conventional Unified Access Control (UAC) techniques, which use a relatively complicated set of mechanisms (algorithm) to determine whether to allow UE transmissions for specific services or state changes.

Furthermore, UAC techniques check for cell barring information using a System Information Block Type1 (SIB1) message. which is semi-static. Using UAC, if the UE changes its radio resource control (RRC) states (i.e., to Connected), a T390 timer, which specifies a start time indicating a time when the cell is barred from access attempts, a stop point indicating a time at which barring will end, and an action to be taken upon expiration of the T390 timer. Various embodiments described herein continue to operate even if the UE changes operating states.

In various embodiments disclosed herein, UL access of one or more UEs is dynamically adjusted in response to the gNB detecting the same event reporting by another UE. This helps avoid transmission of unnecessary redundant traffic, thus saving energy. Additionally, various embodiments restrict normal priority access based on the network load.

In various embodiments, a UE continuously monitors uplink access restrictions received in a unicast or multicast signal, referred to herein as a dynamic uplink access restriction (DUAR) signal. The DUAR signal can, in some embodiments, be implemented as a dedicated new signal, or modified version of an existing signal, e.g., a Wakeup Signal (WuS), a discovery and basic Configuration Protocol (DCP) message, a paging indication, or another suitable signal or message. The DUAR indicates whether or not a UE or UE group may perform uplink transmissions.

In various embodiments, in response to receiving a DUAR signal including a stop indication, the UE stops, or does not start, transmitting UL data. The UE starts or resumes UL transmissions in response to receiving a DUAR signal including a start indication. In some embodiments, using a modified version of an existing signal (e.g., WuS) as a DUAR signal may be a more power-efficient option, because one or more extra bits of a WuS or a group WuS can be utilized for both UL and DL access control of a UE or a group of UEs.

In at least one embodiment, a low-power DUAR signal from a gNB to a UE is used to dynamically adjust the UE UL access restriction upon identifying UL traffic bursts and/or high network load. The DUAR may be applicable in one or more of the following RRC states: IDLE, INACTIVE, or CONNECTED, where state switching has no impact on the restricted access (unlike the existing UAC procedure). Applicability in the CONNECTED state implies that the UE may not send any UL transmissions until the UL access restriction is stopped.

Figures 3, 4:
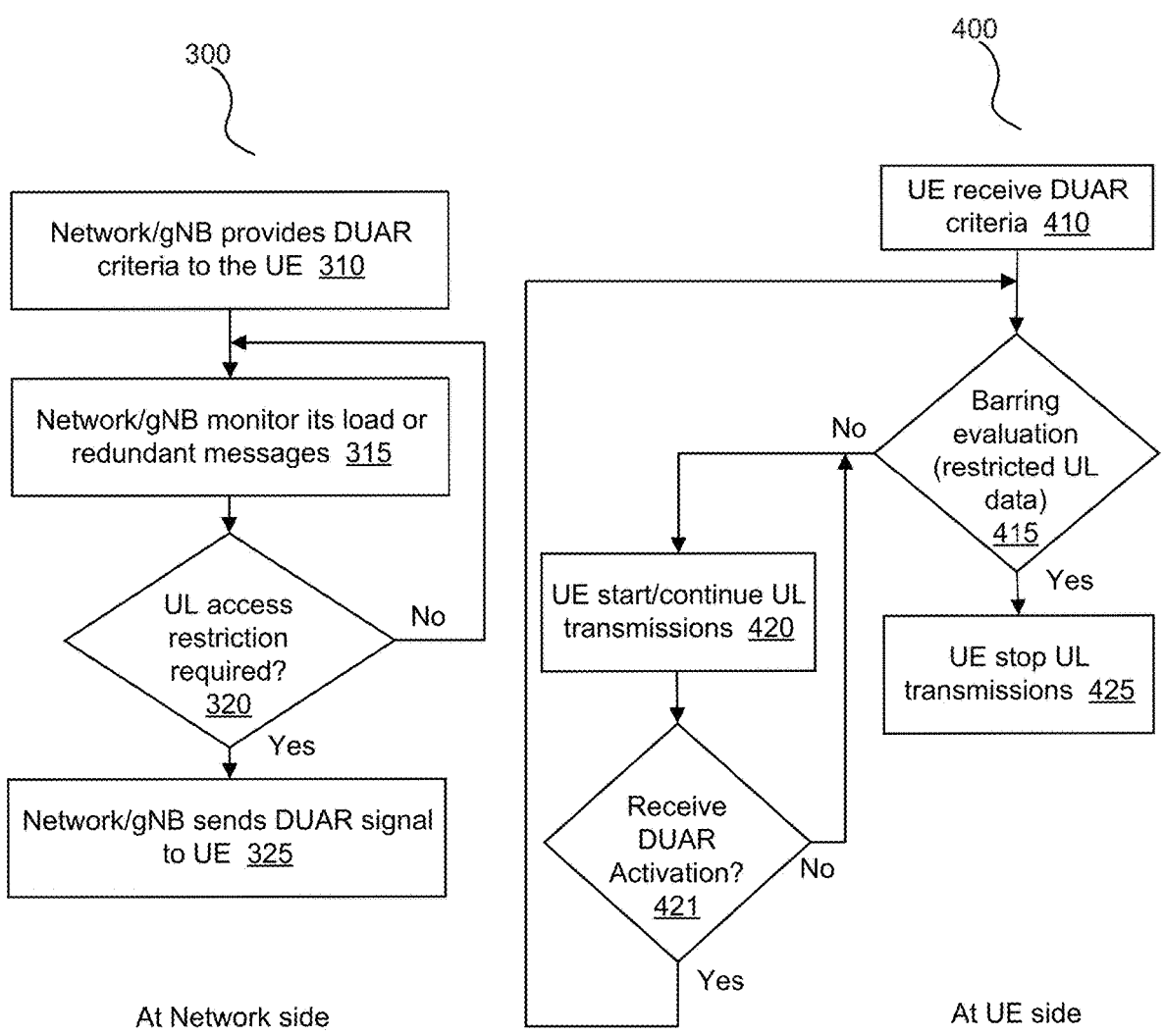
FIG. 3 is a flow chart illustrating a network-side method of dynamically controlling UE uplink access in accordance with various embodiments of the present disclosure.
FIG. 4 is a flow chart illustrating a UE-side method of dynamically controlling UE uplink access in accordance with various embodiments of the present disclosure.

Referring next to FIG. 3, a method 300 of dynamically controlling UE uplink access will be discussed in accordance with various embodiments of the present disclosure. As illustrated by block 310, the network/gNB transmits DUAR criteria to one or more UEs. The DUAR criteria can be used to notify the UE the type of DUAR signal that will be used to transmit uplink restrictions. For example, the DUAR criteria can specify whether a dedicated DUAR signal or a modified WuS will be used to transmit any uplink restriction information to the UE. In some embodiments, the meaning of particular bits within a signal can be defined by the DUAR criteria. In yet other embodiments, the DUAR criteria can specify circumstances or occurrences under which a UE is to restrict its UL transmissions absent receiving an additional DUAR.

As illustrated by block 315, the network/gNB monitors its load and/or checks for redundant UL messages from different UEs. As illustrated by block 320, if the gNB determines, that the load imposed on the gNB by UE UL messages exceeds a load threshold, the gNB determines that the UE UL transmissions satisfy at least one uplink-transmission-restriction criterion, such that UL access restriction is required. In some embodiments, determining whether the estimated load threshold has been exceeded can be based, at least in part, on a number of redundant UL messages received from the UEs. Other suitable criteria can also be tested. For example, the gNB may estimate the load that would be imposed by other UEs sending the same redundant UL messages and may determine that this load would exceed a second load threshold. In some embodiments satisfaction of a single criterion will be sufficient to trigger performance of block 325, but in other embodiments multiple or all criteria must be satisfied before method 300 proceeds to block 325.

As illustrated by block 325, in response to determining that the uplink transmissions satisfy the uplink-transmission-restriction criteria, the gNB generates a dynamic uplink access restriction (DUAR) signal including information indicating uplink access restrictions to be imposed on the one or more UEs, and wirelessly transmits the DUAR signal to one or more UEs.

Referring next to FIG. 4, a method 400 of dynamically controlling UE uplink access will be discussed in accordance with various embodiments of the present disclosure. As illustrated by block 410, the UE receives the DUAR criteria, and block 415 performs a barring evaluation to determine whether one of the UL transmission restrictions applies. As illustrated by block 420, if UL transmission restrictions do not apply, the UE starts or continues transmitting its UL messages. As illustrated by block 425, if UL transmission restrictions apply, the UE stops its UL transmissions.

As illustrated by block 421, if a DUAR activation signal imposing UL transmission restrictions is received by the UE, the method 400 returns to block 415, where the UE checks to performing barring evaluation. In various embodiments, UL transmission restrictions can apply to all UL transmissions from that UE, to all UL transmissions from a group of UEs to which that UE belongs, to certain types of messages, e.g., particular alarm messages transmitted by one or more UEs, or the like.

Figure 5:
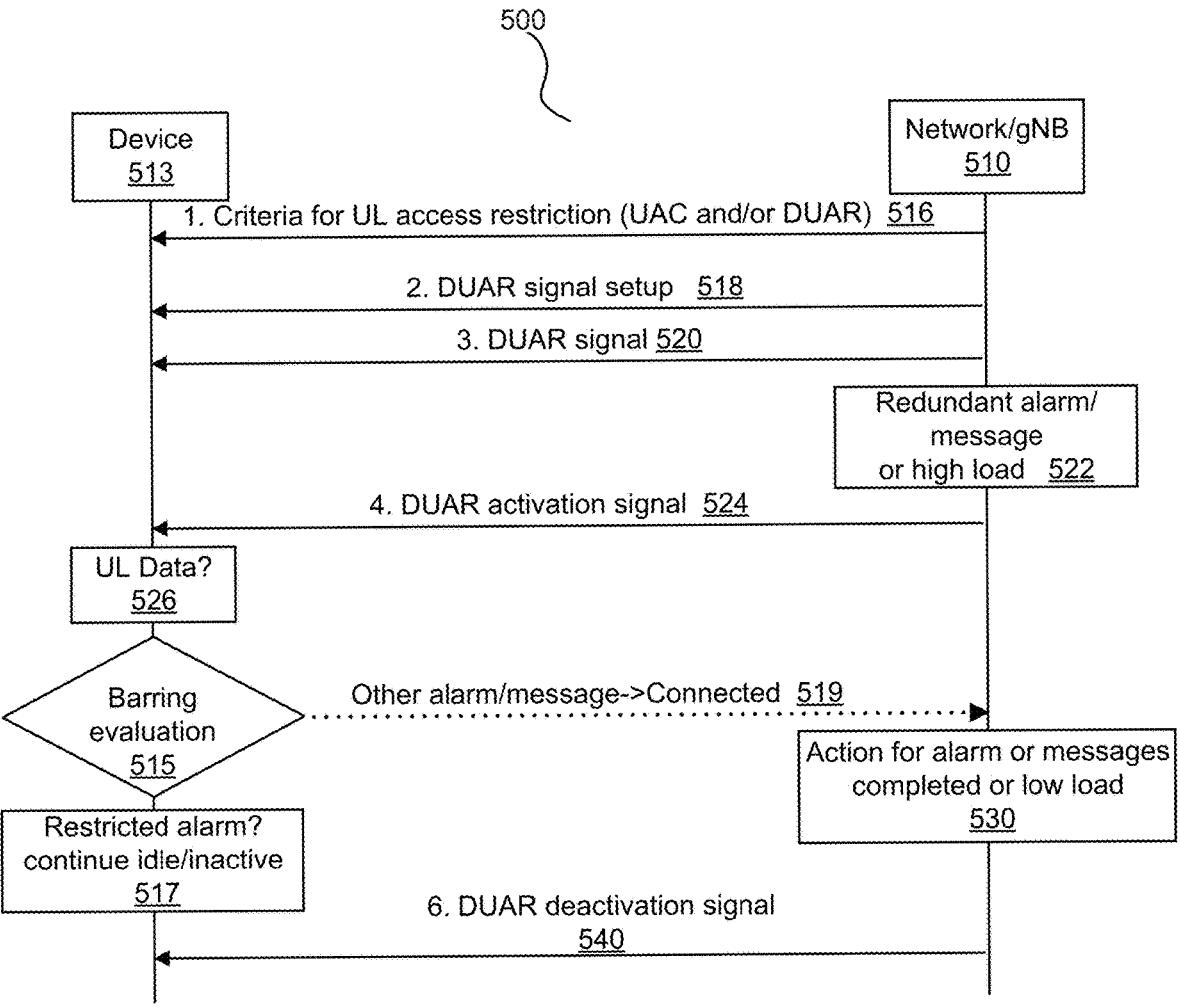
FIG. 5 is a signal flow diagram illustrating communications between a Next Generation Node B (gNB) and a UE in accordance with various embodiments of the present disclosure.

Referring next to FIG. 5, signal flow 500 of uplink (UL) restriction-related communications between a Next Generation Node B (gNB) and a UE will be discussed in accordance with various embodiments of the present disclosure. Network/gNB 510 transmits DUAR criteria 516, which specifies criteria for UE UL access restrictions, e.g., types and/or configuration of DUAR signals, to UE 513. As illustrated by signal flow 500, after UE 513 is informed of the DUAR criteria 516, Network/gNB 510 transmits a DUAR deactivation signal 540, which specifies that UL transmission restrictions are not imposed on the UE.

At block 522, the Network/gNB 510 detects a redundant alarm/message or a high load of UL messages being transmitted by UEs attached to the Network/gNB 510. In response, Network/gNB 510 transmits a DUAR activation signal 524, imposing temporary (e.g., for a particular period of time) UL transmission restrictions on UE 513. As illustrated by block 526, subsequent to receiving DUAR activation signal 524, UE 513 determines whether it has data to send to Network/gNB 510. At block 515, UE 513 performs a barring evaluation, to determine if transmission of its data is allowed under the temporary uplink access restrictions imposed by DUAR activation signal 524. If a non-restricted message, such as other alarm/message 518 is to be transmitted by UE 513 on the UL, the next time the UE 513 connects to Network/gNB 510, UE 513 will transmit other alarm/message 519. If, however, transmission of its data is not permitted under the temporary uplink access restrictions imposed by DUAR activation signal 524, e.g., a restricted alarm, UE 513 continues in an idle or inactive state as illustrated by block 517.

As illustrated by block 530, in response to determining that the circumstance that caused Network/gNB 510 to generate and transmit DUAR signal 524 no longer exists, Network/gNB 510 generates and transmits a DUAR deactivation signal 540, returning UE UL transmission restrictions to normal, which in some embodiments permits unrestricted UL transmissions.

In general, the network, e.g., the gNB, provides the criteria for UL access restrictions to one or more UEs. In various embodiments, dynamic control of UL transmissions can be performed using dynamic UL access restriction (DUAR) signal-based and/or UAC-based barring evaluation. In some embodiments, DUAR-based dynamic barring evaluation is monitored after UAC based semi-static procedure if the latter is configured. Alternatively, DUAR-based dynamic barring evaluation can be monitored starting immediately upon its configuration.

The network provides DUAR signal setup to UEs, for example RedCap or IoT devices, where the DUAR signal could be any existing signal, e.g., WuS, DCP, paging indication etc., or a new dedicated signal. If an existing signal is used, the normal mode of operation for the signal (i.e., DUAR deactivation) is defined by the legacy configuration and a temporary mode of operation for the signal (i.e., DUAR activation) is defined by the modified version of the normal signal for UL access restriction.

An UL access restriction signal can be used to indicate whether a single UE or a UE group is allowed to send alarm signals, or other signals on the UL. The network may preconfigure UE groups and indicate the ID of the group to which UL access restriction is applicable within a field of the DUAR signal. As noted earlier, a DUAR signal can dynamically change the access restriction status of one or more UEs. In an example embodiment, this may be implemented through a modified configuration of the DUAR activation signal.

A DUAR signal may also dynamically determine the start time for UL access restriction where the end of the UL access restriction is based on a preconfigured access restriction period. The access restriction period configuration may be provided in system information or via RRC configuration. Alternatively, the DUAR signal may also dynamically determine the access restriction period.

The UL access restriction signal can be a WuS or Group WuS. Using WuS with the wake-up receiver (WRx), additional synchronization with the network is not needed in comparison to UAC because the WRx receives WUS beacons for synchronization and the WUS for waking up the UE. WuS are available for all RRC states, including the connected state. The network, e.g., the gNB, provides normal and temporary WuS configuration to the UE WRx. This configuration can be done using broadcast (system information) and/or dedicated (e.g., RRC Reconfiguration) signaling.

The network temporarily re-configures the WuS setup (i.e., wake-up cycle called w-cycle, wake-up receiver (WRx) ON duration, w-offset, and inactivity timer), in case of additional added bits for UL restriction. In cases of a relatively high network load, as indicated when a network load threshold has been satisfied, normal priority access can be restricted through temporary WuS. In various embodiments, in response to the UE detecting a temporary WuS, the UE can remain asleep based on UL access restriction, which is the reverse of mobile initiated connection only (MICO) mode.

The device continues with a normal WuS signal setup for DL control. In case the network receives redundant alarm/ messages, or the network load is relatively high, the network transmits the temporary WuS to UE to indicate activation of UL access restrictions on a device or group of devices or to forbid low-priority UEs access based on the prior configuration. Based on receiving early event reports from some UEs, the gNB may be able to determine that a large number of UEs are likely to access the system to send the same event report. Then it may be beneficial for the gNB to rapidly and temporarily prevent access to all such UEs, which may have some shared identity. In various embodiments, access to all UL can be restricted for all UEs, some UEs, all UL transmissions, some UL transmissions, or some variations thereof. For example, some UEs can be restricted from transmitting certain alarms, other UEs can be restricted from sending any UL transmissions, while still other UEs are not restricted.

In various embodiments, a low-power WuS from gNB to UE is used to dynamically adjust the UE determination regarding UL access restriction upon identifying UL traffic bursts and/or high network load. In various implementations, when the device has UL data, it performs DUAR signal-based barring evaluation. In case the data corresponds to a prohibited alarm/message, the device continues with its sleep state (which can be an Idle/Inactive state). But if there is another message/alarm that is not restricted, the device may go to a connected state for transmission.

DUAR is applicable in one or more of the following RRC states: IDLE or INACTIVE or CONNECTED where state switching has no impact on the restricted access (unlike the existing UAC procedure). Reception of the DUAR signal in the CONNECTED state may prohibit all UL transmissions, including PUSCH, PUCCH, scheduling request, and PRACH (based on PDCCH order) from starting immediately. Alternatively, reception of the DUAR signal may not prohibit one or more of previously scheduled PUSCH, PUCCH, or PRACH.

In one example embodiment, the UE shall receive a certain amount of DUAR signal during a certain period for UL access restriction is to be allowed. In an alternative example embodiment, in case the UE cannot successfully decode the DUAR signal for a given, desired, dynamically configured, or predetermined number of times (e.g., one, two, or a configurable number of times), the UL access restriction is disallowed.

In at least one embodiment, if the UE is already engaged in transmission, it stops transmitting UL data in case the DUAR criteria is met, e.g., the DUAR signal is received, and the UL access restriction is determined to be active. The UL access restriction evaluation includes UAC-based and/or DUAR-based barring evaluation.

Once the actions related to redundant alarms/messages are completed or the network load is low, e.g., below a threshold loading level, the network switches the access restriction signal to DUAR deactivation. If the UE previously stopped transmission because of activation of UL access restriction, it may resume UL transmissions when the UL access restriction is not valid anymore. If DUAR is used together with at least one other UL access restriction criterion, UE applies UL access restriction only if all the criteria are fulfilled. Alternatively, the UE may be configured to apply UL access restriction if one or more of the criteria are fulfilled.

Figure 6:
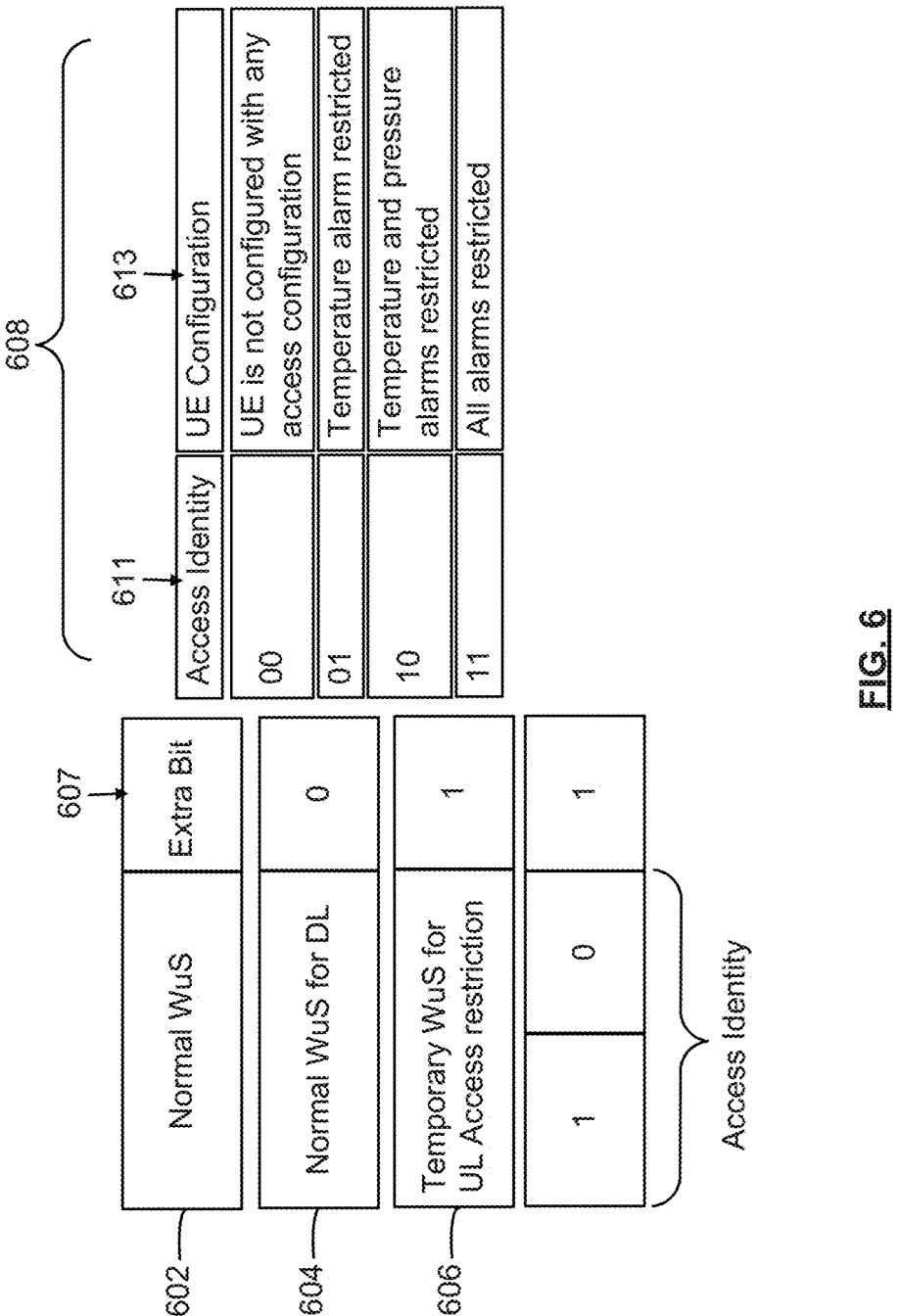
FIG. 6 is a diagram illustrating a temporary Wakeup Signal (WuS) in accordance with various embodiments of the present disclosure.

Referring next to FIG. 6, a temporary Wakeup Signal (WuS) 600 is discussed in accordance with various embodiments of the present disclosure. As illustrated by FIG. 6, a normal WuS 602, includes an extra bit 607. In a normal WuS for downlink (DL) 604, extra bit 607 is set to a value of "0," indicating that the WuS is a normal WuS. For a temporary WuS 606, the extra bit 607 is set to a value of "1," indicating that the WuS is a temporary WuS. Thus, the extra bit in a WuS can be used to notify a UE that the WuS is a temporary WuS, instead of a normal WuS.

Once the UE knows that a received WuS is a temporary WuS, the UE can look to the access identity bits 609 to determine which UL access restrictions apply to the UE. Data structure 608 includes an access identity column, or field, 611, and a UE configuration column, or field, 613. The access identity bits 609 correspond to a row of data structure 608. In various embodiments, the information included in data structure 608 is provided to the UE in advance of the UE receiving the WuS. The information can be provided in the UE in any suitable control signal or message received from the gNB, including a DUAR signal, or the UE can be preconfigured to include the information before being placed into service.

In an example of using the access identity bits 609, if access identity bits 609 are "00," the UE will not be configured with any uplink access restrictions, and is free to access the UL transmission media for any messages it has to send. If access identity bits 609 are "01," the UE is prohibited from transmitting any temperature alarms, but is free to access the UL transmission media for any other messages it has to send. If access identity bits 609 are "10," the UE is prohibited from transmitting any temperature or pressure alarms, but is free to access the UL transmission media for any other messages it has to send. If access identity bits 609 are "11," the UE is prohibited from transmitting any alarms, but is free to access the UL transmission media to transmit any non-alarm messages.

More or fewer bits can be used to specify a corresponding number of transmission restrictions, transmission type restrictions, or to define any other UE UL transmission restriction parameters desired.

Figure 7:
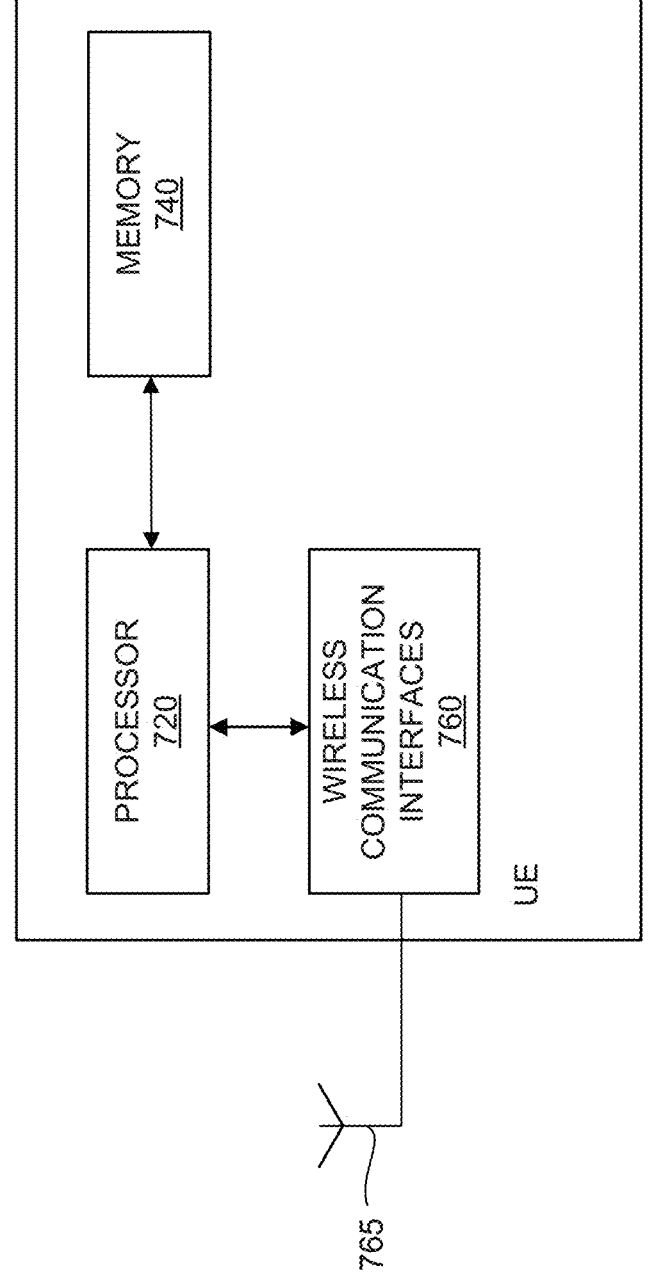
FIG. 7 is a block diagram illustrating an example embodiment of a user equipment device (UE).

FIG. 7 illustrates an example embodiment of a user equipment device UE, as disclosed herein. As shown, the UE includes: a memory 740; a processor 720 connected to the memory 740; various interfaces 760 connected to the processor 720; and one or more (e.g., a plurality of) antennas or antenna panels 765 connected to the various interfaces 760. The various interfaces 760 and the antenna 765 may constitute a transceiver for transmitting/receiving data from/to other network elements (e.g., other UEs, gNBs, LMFs, TRPs, etc.) via one or more antenna beams. As will be appreciated, depending on the implementation of the UE, the UE may include many more components than those shown in FIG. 7. However, it is not necessary that all of these generally conventional components be shown in order to disclose the illustrative example embodiment.

The memory 740 may be a computer readable storage medium that generally includes a random access memory (RAM), read only memory (ROM), and/or a permanent mass storage device, such as a disk drive. The memory 740 also stores an operating system and any other routines/modules/applications for providing the functionalities of the UE to be executed by the processor 720. These software components may also be loaded from a separate computer readable storage medium into the memory 740 using a drive mechanism (not shown). Such separate computer readable storage medium may include a disc, tape, DVD/CD-ROM drive, memory card, or other like computer readable storage medium (not shown). In some example embodiments, software components may be loaded into the memory 740 via one of the various interfaces 760, rather than via a computer readable storage medium.

The processor 720 may be configured to carry out instructions of a computer program by performing the arithmetical, logical, and input/output operations of the system. Instructions may be provided to the processor 720 by the memory 740.

The various interfaces 760 may include components that interface the processor 720 with the antenna 765, or other input/output components. As will be understood, the various interfaces 760 and programs stored in the memory 740 to set forth the special purpose functionalities of the UE will vary depending on the implementation of the UE.

The interfaces 760 may also include one or more user input devices (e.g., a keyboard, a keypad, a mouse, or the like) and user output devices (e.g., a display, a speaker, or the like).

While one or more example embodiments may be described from the perspective of a user equipment (UE) or gNB, it should be understood that one or more example embodiments discussed herein may be performed by one or more processors (or processing circuitry) at the applicable device. For example, according to one or more example embodiments, at least one memory may include or store computer-executable instructions that, when executed by at least one processor, cause the UE or gNB to perform one or more operations discussed herein.

As discussed herein, the terminology "one or more" and "at least one" may be used interchangeably.

As discussed herein, a Next Generation Node B (gNB) may also be referred to as a base station, an access point, an enhanced NodeB (eNodeB), or more generally, a radio access network element, a radio network element, or a network node. A user equipment device (UE) may also be referred to herein as a mobile station, and may include a mobile phone, a cell phone, a smartphone, a handset, a personal digital assistant (PDA), a tablet, a laptop computer, a phablet, a vehicle including a vehicular communication system, an Internet-of-Things (IoT) device, or the like.

As discussed herein, transmission resources may also be referred to as radio or cellular resources for transmitting, and may include, for example, time and/or frequency resources for transmitting information and/or data between devices.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the preceding description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures, and techniques may be shown without unnecessary detail in order to avoid obscuring example embodiments.

As discussed herein, illustrative embodiments have been described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing user equipment or other network elements and/or hardware. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently, or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing, or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory, and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically.

Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, user equipment, or other network elements, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A radio access network element comprising:
a processor;
a memory coupled to the processor, the memory storing computer-executable instructions; and
wherein the processor is configured to execute the computer-executable instructions to cause the radio access network element to
generate a signal including information indicating uplink access restrictions to be imposed on one or more user equipment devices in response to determining that at least one uplink-transmission-restriction criterion is satisfied, and
transmit the signal to the one or more user equipment devices.

2. The radio access network element of claim 1, wherein the signal includes information indicating that uplink transmissions of one or more particular types of signals are restricted.

3. The radio access network element of claim 1, wherein the signal includes information indicating whether the uplink access restrictions are applicable for a particular period of time.

4. The radio access network element of claim 1, wherein the processor is further configured to execute the computer-executable instructions to cause the radio access network element to transmit at least one dynamic uplink access restriction (DUAR) criteria to the one or more user equipment devices.

5. The radio access network element of claim 1, wherein the processor is further configured to execute the computer-executable instructions to cause the radio access network element to 15
16 determine that the at least one uplink-transmission-restriction criterion is no longer applicable, in response to determining that the at least one uplink-transmission-restriction criterion is no longer applicable, generate a second signal including information indicating that the uplink access restrictions are no longer to be imposed, and transmit the second signal to the one or more user equipment devices.

6. The radio access network element of claim 1, wherein the processor is further configured to execute the computer-executable instructions to cause the radio access network element to:

receive uplink transmissions from the one or more user equipment devices, and determine that the uplink transmissions from the one or more user equipment devices satisfy at least one uplink-transmission-restriction criterion.

7. The radio access network element of claim 1, wherein the signal includes:

a wakeup signal (WuS) including one or more bits defining the uplink access restrictions.

8. The radio access network element of claim 7, wherein the processor is configured to execute the computer-executable instructions to cause the radio access network element to transmit a signal, including information indicating that a WuS is configured to include information associated with uplink access restrictions, to the one or more user equipment devices using a broadcast system information signal or dedicated radio resource control (RRC) signal.

9. The radio access network element of claim 1, wherein the processor is configured to execute the computer-executable instructions to cause the radio access network element to preconfigure a plurality of user equipment devices into a group to which particular uplink access restrictions apply, wherein the group is assigned a group identifier; and wherein the signal includes the group identifier.

10. The radio access network element of claim 1, wherein the signal transmitted to the one or more user equipment devices restricts transmission of uplink messages during an uplink access restriction period.

11. A user equipment device comprising:

a processor;

a memory coupled to the processor, the memory storing computer-executable instructions; and the processor is configured to execute the computer-executable instructions to cause the user equipment device to receive, from a radio access network element, a signal including information indicating uplink access restrictions to be imposed on the user equipment device, stop uplink transmissions of one or more particular types based on a determination that the uplink access restrictions apply to the uplink transmissions of the one or more particular types, and transmit uplink messages to the radio access network element in accordance with the signal based on a determination that the uplink access restrictions do not apply to the uplink messages.

12. The user equipment device of claim 11, wherein the signal includes information indicating that the uplink transmissions of the one or more particular types of signals are restricted.

13. The user equipment device of claim 11 wherein the signal includes information indicating whether the uplink access restrictions are applicable for a particular period of time.

14. The user equipment device of claim 11, wherein the processor is further configured to execute the computer-executable instructions to cause the user equipment device to receive at least one dynamic uplink access restriction (DUAR) criteria from the radio access network element.

15. The user equipment device of claim 11, wherein the processor is further configured to execute the computer-executable instructions to cause the user equipment device to receive a second signal including information indicating that the uplink access restrictions are no longer to be imposed.

16. The user equipment device of claim 11, wherein the processor is further configured to execute the computer-executable instructions to cause the user equipment device to receive via a broadcast system information signal or dedicated radio resource control (RRC) signal information indicating that a WuS is configured to include information associated with uplink access restrictions.

17. The user equipment device of claim 11, wherein:

the signal includes a group identifier identifying a group of user equipment devices to which particular uplink access restrictions apply, and wherein the processor is further configured to execute the computer-executable instructions to cause the user equipment device to determine, based on the group identifier, whether the uplink access restrictions apply to the user equipment device.

18. A method comprising:

determining, by a radio access network element, that at least one uplink-transmission-restriction criterion is satisfied;

generating, at the radio access network element, a signal including information indicating uplink access restrictions to be imposed on one or more user equipment devices; and transmitting the signal from the radio access network element to the one or more user equipment devices.

19. The method of claim 18, wherein the signal includes information indicating that uplink transmissions of one or more particular types of signals are restricted.

20. The method of claim 18, further comprising:

transmitting a deactivation signal from the radio access network element to the one or more user equipment devices, wherein the deactivation signal indicates that the uplink access restrictions are to be terminated.

* * * * *